(12) United States Patent
Hara et al.

(10) Patent No.: US 11,327,088 B2
(45) Date of Patent: May 10, 2022

(54) AUTOMATIC ANALYZER

(71) Applicant: Hitachi High-Technologies Corporation, Tokyo (JP)

(72) Inventors: Masaki Hara, Tokyo (JP); Takamichi Mori, Tokyo (JP); Masato Ishizawa, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 421 days.

(21) Appl. No.: 16/076,807

(22) PCT Filed: Jan. 13, 2017

(86) PCT No.: PCT/JP2017/003480
§ 371 (c)(1),
(2) Date: Aug. 9, 2018

(87) PCT Pub. No.: WO2017/141696
PCT Pub. Date: Aug. 24, 2017

(65) Prior Publication Data
US 2019/0018033 A1  Jan. 17, 2019

(30) Foreign Application Priority Data
Feb. 19, 2016 (JP) .............................. JP2016-029643

(51) Int. Cl.
*G01N 35/04* (2006.01)
*G01N 35/10* (2006.01)
*G01N 35/02* (2006.01)

(52) U.S. Cl.
CPC ........... *G01N 35/04* (2013.01); *G01N 35/025* (2013.01); *G01N 35/1002* (2013.01);
(Continued)

(58) Field of Classification Search
None
See application file for complete search history.

(56) References Cited

U.S. PATENT DOCUMENTS 4,799,853 A * 1/1989 Wrobbel ................. B25J 15/00
                                                             294/90
5,171,530 A * 12/1992 Pennatto ................. B01L 9/06
                                                              422/63
(Continued)

FOREIGN PATENT DOCUMENTS

CN  1576849 A   2/2005
JP  5-31599     4/1993
(Continued)

OTHER PUBLICATIONS

Machine-genarated English translation of JP-200802036-A, published Jan. 2008.*
(Continued)

*Primary Examiner* — Kathryn Wright
(74) *Attorney, Agent, or Firm* — Crowell & Moring LLP

(57) ABSTRACT

A reagent-bottle lid opening mechanism is disclosed, which has a needle for piercing a lid of a reagent bottle to be delivered to a reagent disk, has an aligning mechanism of automatically adjusting a position of the needle with respect to the lid such that a needle body of the needle can stick in the center of the lid, and accurately and repeatedly makes an incision in the center of the lid. As a result, an automatic analyzer is provided that is capable of unsealing the center of the lid of the reagent bottle with accuracy even if the central axis of the needle and the central axis of the lid are offset from each other.

12 Claims, 13 Drawing Sheets

(52) U.S. Cl.
CPC ..... *G01N 35/1011* (2013.01); *G01N 35/1079* (2013.01); *G01N 35/10* (2013.01); *G01N 2035/0405* (2013.01); *G01N 2035/0406* (2013.01); *G01N 2035/0443* (2013.01); *G01N 2035/0444* (2013.01); *G01N 2035/0446* (2013.01)

(56) References Cited

U.S. PATENT DOCUMENTS

| | | | |
|---|---|---|---|
| 5,578,272 | A | 11/1996 | Koch et al. |
| 2004/0067165 | A1 | 4/2004 | Isobe et al. |
| 2005/0207938 | A1 | 9/2005 | Hanawa et al. |
| 2007/0231217 | A1* | 10/2007 | Clinton .............. G01N 35/1079 422/119 |

FOREIGN PATENT DOCUMENTS

| | | |
|---|---|---|
| JP | 6-18531 A | 1/1994 |
| JP | 2004-125677 A | 4/2004 |
| JP | 2008020361 A * | 1/2008 ......... G01N 35/1002 |
| JP | 2010-107308 A | 5/2010 |
| WO | WO 2009/017065 A1 | 2/2009 |
| WO | WO 2015/105079 A1 | 7/2015 |

OTHER PUBLICATIONS

International Preliminary Report on Patentability (PCT/IB/338 & PCT/IB/373) issued in PCT Application No. PCT/JP2017/003480 dated Aug. 30, 2018, including English translation (Japanese-language Written Opinion (PCT/ISA/237) previously filed on Aug. 9, 2018) (nine (9) pages).

International Search Report (PCT/ISA/210) issued in PCT Application No. PCT/JP2017/003480 dated Apr. 11, 2017 with English translation (five (5) pages).

Japanese-language Written Opinion (PCT/ISA/237) issued in PCT Application No. PCT/JP2017/003480 dated Apr. 11, 2017 (four (4) pages).

Chinese-language Office Action issued in Chinese Application No. 201780010373.9 dated Dec. 29, 2020 (25 pages).

* cited by examiner

AUTOMATIC ANALYZER

TECHNICAL FIELD

The present invention relates to an automatic analyzer that analyzes reagents, liquid samples such as blood, urine or the like and, more particularly, to an automatic analyzer that automatically opens the lid of a reagent bottle.

BACKGROUND ART

Patent Literature 1 discloses the invention designed to insert a suction tube to a position of the central axis of a specimen container, in which a piercer has a distal end formed to be able to pass through a sealed lid of a long vial, a piercer moving unit has a function of moving the piercer in the vertical direction and a specimen treatment apparatus has a horizontal arm fixedly holding the piercer, a screw shaft passing through the horizontal arm in the vertical direction and a nut threaded on the screw shaft.

CITATION LIST

Patent Literature

Patent Literature 1: Japanese Unexamined Patent Application Publication No. 2010-107308

SUMMARY OF INVENTION

Technical Problem

In typical work a human operator opens a lid of a reagent bottle and then a reagent used in the automatic analyzer is placed in the analyzer. In recent years it is known that a needle is used to make an incision in a lid of the reagent and then a reagent probe is inserted through the incised hole to suck the reagent.

The incision of the reagent bottle is closed before insertion of the reagent probe. In reagent aspiration, the reagent probe is inserted while opening up the hole of the incision. The incision is structured to be closed again after the reagent probe is removed from the lid. Such a structure of the lid closing provides advantages of reducing the length of time during which the reagent in the reagent bottle is exposed to outside air, of ensuring reagent stability, of increasing the fill of the reagent bottle, and the like.

Here, in step with an improvement in processing speed of the automatic analyzers, the operation of each mechanism is increasingly faster, and the reagent probe also operates increasingly faster than ever before.

In order for the reagent probe to be moved down at high speed into a small hole incised in the lid of the reagent bottle for the sucking operation, a technique of accurately making an incision at the center of the lid of the reagent bottle is required.

The technique disclosed in Patent Literature 1 has a disadvantage of the difficulty of making an incision at the center of the lid of the reagent bottle if the piercer and the central axis of the lid are offset from each other, because the piercer is secured to the horizontal arm. Also, to sidestep such a problem, the work to align the center of the needle with the center of the lid by taking time to adjustment may be instanced, but this has a disadvantage of being impractical due to need for much time and effort.

As described above, the operation to use a needle to pierce a hole at the center of the lid with stability at all times is a critical issue for fast insertion of the reagent probe through the hole slightly incised in the lid of the reagent bottle.

Here, because the lid of the reagent bottle has a tapered-down, conical shape, the center of the lid is the vertex of the conical shape. If the position in which piercing operation using a needle is performed on the lid is misaligned, in the worst scenario, when the reagent probe is moved down in the reagent aspiration operation, the reagent probe apex may come into contact with the vertex of the conical shape of the lid without incision, incurring a risk of bending the reagent probe.

The present invention has been made to address the above problems and it is an object of the present invention to provide an automatic analyzer capable of unsealing the center of a lid of a reagent bottle with precision even if the center of a needle and the central axis of the lid are offset from each other.

Solution to Problem

To solve the above problems, for example, the configuration disclosed in the claims may be employed.

The present invention includes a plurality of technical solutions to the problems, one example of which is an automatic analyzer that dispenses a sample and a reagent into each of multiple reaction containers to initiate a reaction and then measures the reacted liquid, and includes: a reagent disk for holding reagent bottles containing the reagent; and a reagent-bottle lid opening unit that has a needle for piercing a lid of the reagent bottle which has been entered into the automatic analyzer and is to be delivered to the reagent disk, wherein the reagent-bottle lid opening unit has an aligning mechanism of adjusting a position of the needle with respect to the lid such that the needle sticks in a center of the lid.

Advantageous Effects of Invention

According to the present invention, the automatic analyzer can be provided capable of repeatedly and accurately unsealing the center of a lid of a reagent bottle, and offering reliable reagent dispensing performance. The above and other aspects, features and advantageous effects will be more apparent from the following descriptions of embodiments.

DESCRIPTION OF EMBODIMENTS

Figure 1:
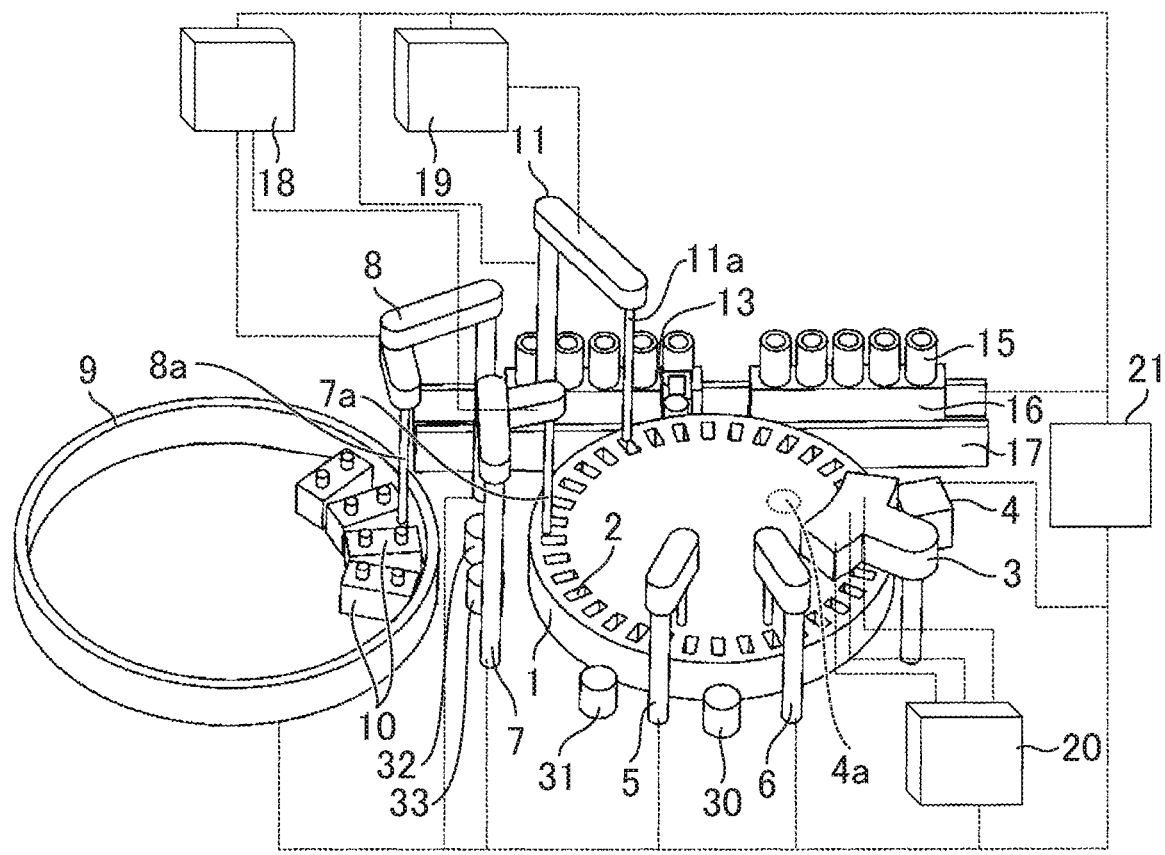
FIG. 1 is a schematic diagram illustrating the overall configuration of an automatic analyzer in accordance with the embodiment.

An embodiment of an automatic analyzer according to the present invention will be described with reference to FIG. 1 to FIG. 23. FIG. 1 is a perspective view of an automatic analyzer in accordance with an example of the embodiment.

Figure 2:
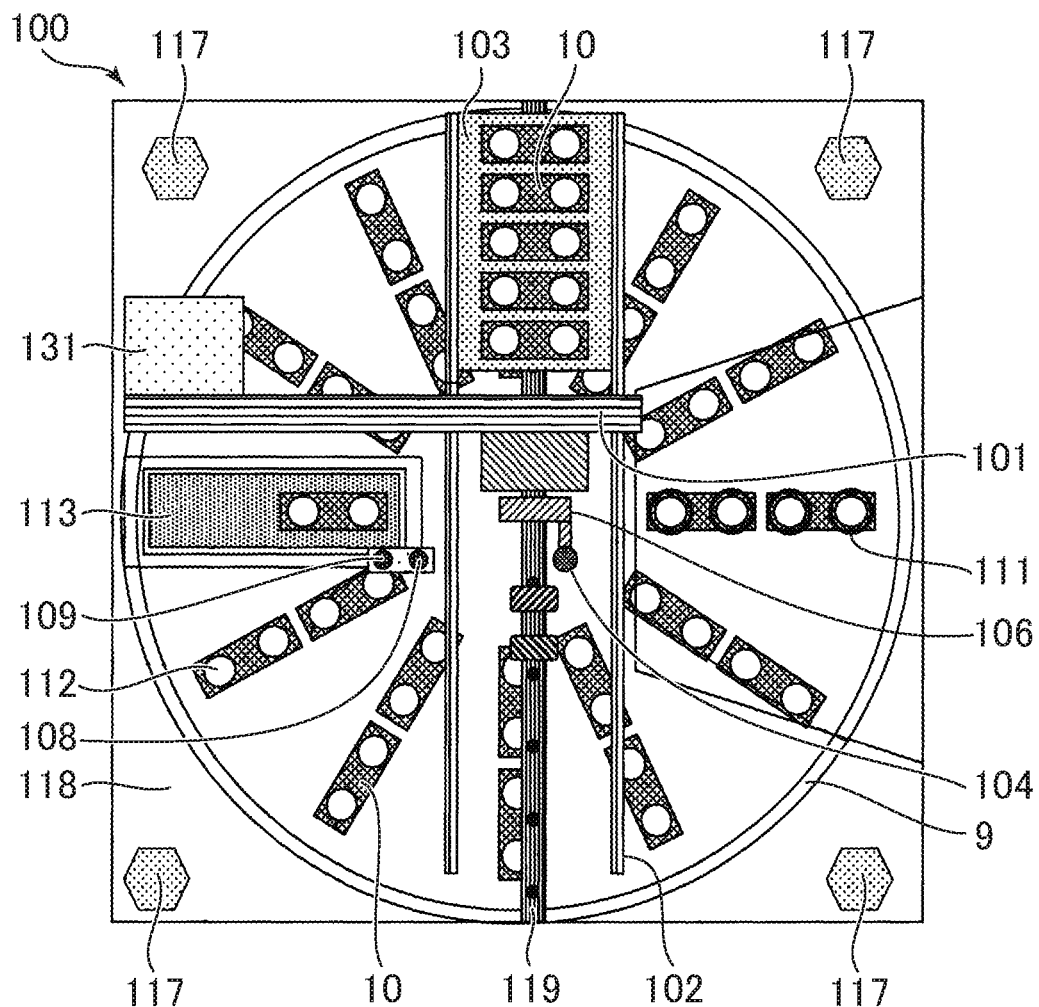
FIG. 2 is a diagram illustrating the configuration of an autoloader installed in the automatic analyzer in accordance with the embodiment.

In FIG. 1, an automatic analyzer is an apparatus that dispenses a sample and a reagent into each of multiple reaction containers 2 to initiate a reaction and then measures the reacted liquid, which includes a reaction disk 1, a sample disk 9, a sample transfer mechanism 17, reagent dispensing mechanisms 7, 8, a reagent syringe 18, a sample dispensing mechanism 11, a sample syringe 19, a cleaning mechanism 3, a light source 4a, a spectrophotometer 4, agitation mechanisms 5, 6, a cleaning pump 20, cleaning baths 13, 30, 31, 32, 33, a controller 21 and an autoloader mechanism 100 (see FIG. 2).

The reaction containers 2 are circularly arranged in the reaction disk 1. In the proximity of the reaction disk 1, the sample transfer mechanism 17 is placed to transfer a rack 16 on which sample containers 15 are loaded.

The sample dispensing mechanism 11, which is rotatable and vertically movable, is placed between the reaction disk 1 and the sample transfer mechanism 17, and includes a sample probe 11a. The sample probe 11a is connected to the sample syringe 19. The sample probe 11a moves along an arc around a rotation axis to dispense sample from the sample container 15 into the reaction container 2.

A plurality of reagent bottles 10 can be placed on the reagent disk 9 in circumferential arrangement. The reagent disk 9 is maintained in cool condition and is covered with a cover equipped with a suction port 111 (see FIG. 2).

The rotatable and vertically movable reagent dispensing mechanisms 7, 8 are placed between the reaction disk 1 and the reagent disk 9, and respectively include reagent probes 7a, 8a. The reagent probes 7a, 8a are connected to the reagent syringe 18. The reagent probes 7a, 8a moves along an arc around a rotation axis and accesses the interior of the reagent disk 9 via the suction port 111 to dispense a reagent from the reagent bottle 10 into the reaction container 2.

The cleaning mechanism 3, the light source 4a, the spectrophotometer 4 and the agitation mechanisms 5, 6 are further placed around the reaction disk 1. The cleaning mechanism 3 is connected to the cleaning pump 20. The cleaning baths 32, 33, 13, 30, 31 are placed respectively in the operating ranges of the reagent dispensing mechanisms 7, 8, the sample dispensing mechanism 11, and the agitation mechanisms 5, 6. The sample container 15 contains a test sample (specimen) such as blood or the like, and is placed on the rack 16 to be transferred by the sample transfer mechanism 17. Each mechanism is connected to the controller 21.

The controller 21 includes a computer and/or the like to control operation of each of the above-described mechanisms in the automatic analyzer and also performs arithmetic processing to determine a concentration of a predetermined component in a liquid sample such as blood, urine or the like.

A typical configuration of automatic analyzers has been described.

The analysis process for a testing sample by an automatic analyzer as described above is carried out typically according to the following procedure.

Initially, a sample container 15 placed on the rack 16 is carried to near the reaction disk 1 by the sample transfer mechanism 17, and a sample in the sample container 15 is dispensed into a reaction container 2 on the reaction disk 1 by the sample probe 11a of the sample dispensing mechanism 11. Then, a reagent to be used for analysis is dispensed from a reagent bottle 10 on the reagent disk 9 into the reaction container 2 into which the sample has been dispensed, by the reagent dispensing mechanism 7, 8. Subsequently, agitation of a liquid mixture of the sample and the reagent in the reaction container 2 is performed by the agitation mechanism 5.

After that, light emitted from the light source 4a is caused to pass through the reaction container 2 containing the liquid mixture after the agitation, and then an intensity of the transmitted light is measured by the spectrophotometer 4. The intensity measured by the spectrophotometer 4 is sent through an A/D converter and an interface to the controller 21. Then, the controller 21 performs arithmetic to determine a concentration of a predetermined component in the testing sample such as blood, urine or the like, and causes a display unit (not shown) or the like to display the result or stores the result in memory (not shown).

The configuration of the autoloader mechanism 100 will now be described with reference to FIG. 2 and subsequent figures. FIG. 2 is a diagram illustrating the overview of the autoloader mechanism 100.

As described above, a lid 112 is attached to a reagent-probe suction-port position of the reagent bottle 10 for hermetically sealing off the interior, and typically, for setting into the automatic analyzer, the lid 112 is detached and then the reagent bottle 10 is placed in the automatic analyzer. In recent years, however, a method has been employed to make an incision-like hole in the lid 112 and insert the reagent probe 7a, 8a into the incision-like hole to suck the reagent in the reagent bottle 10. Because, for reagent, the opening of the lid 112 is a slight incision, the exposure of the reagent to outside air is minimized to retard the reagent deterioration further than even before. In such a case, as long as a human operator places a new unopened reagent bottle 10 in the automatic analyzer, the reagent bottle 10 is automatically perforated in the lid 112 and placed in the reagent disk 9. A mechanism for that purpose is an autoloader mechanism 100.

The autoloader mechanism 100 is placed above the reagent disk 9 and is configured as illustrated in FIG. 2. In FIG. 2, the autoloader mechanism 100 includes a reagent loading unit 103, a reagent loading mechanism (transfer line) 102, a reagent transfer mechanism (reagent transfer unit) 101, a needle cleaning bath 108, a needle drying port 109, support struts 117, and a metal plate 118. Those mechanisms except the support struts 117 are configured to be mounted on the single metal plate 118.

The reagent loading unit 103 is a section on which a human operator places a reagent bottle 10 when the reagent bottle 10 is entered into the automatic analyzer. The reagent loading mechanism 102 moves the reagent lading unit 103 in the vertical direction on FIG. 2. The operating range of the reagent loading unit 103 is set to fit within the analyzer by being secured to the metal plate 118 on which the autoloader mechanism 100 is place. The reagent loading unit 103 is structured to allow a plurality of reagent bottles 10 to be arranged linearly, which is, for example, a tray having a plurality of reagent-bottle slots for placing the reagent bottles 10.

The reagent loading mechanism 102 is configured such that the reagent loading unit 103 is moved on rails along a guide by power of a motor or the like, the guide being placed between a position where the reagent bottle 10 is entered into the analyzer and a standby position of the reagent loading unit 103.

The reagent transfer mechanism 101 is a mechanism for transferring the reagent bottle 10 placed on the reagent loading unit 103 into the reagent disk 9, which includes as constituent components: a gripper mechanism (gripper unit) 106 to grip the reagent bottle 10; a reagent-bottle lid opening mechanism (reagent-bottle lid opening unit) 104 to make an incision-like hole in the lid 112 of the reagent bottle 10; a vertical drive motor 130 (see FIG. 7) to move the reagent-bottle lid opening mechanism 104 in the vertical direction; and a horizontal drive motor 131 to drive the gripper mechanism 106 and the reagent-bottle lid opening mechanism 104 in the horizontal direction on FIG. 2.

The reagent transfer mechanism 101 operates in the lateral direction on FIG. 2 between a position of the reagent loading unit 103 and a position of an access cover 113 in FIG. 2. Specifically, the reagent loading unit 103 moves in the vertical direction on FIG. 2, and the reagent transfer mechanism 101 operates in the horizontal direction on FIG. 2, so that the reagent loading unit 103 and the reagent transfer mechanism 101 are configured such that the operation directions are orthogonal to each other. Also, in the reagent transfer mechanism 101, the position where the gripper mechanism 106 grips the reagent bottle 10 and the position where the reagent bottle 10 is delivered into/removed from the reagent disk 9 are arranged linearly.

The reagent-bottle lid opening mechanism 104 has a needle 300 (see FIG. 7) attached thereto to make an incision in the lid 112 of the reagent bottle. In the reagent-bottle lid opening mechanism 104, a needle body 105 (see FIG. 9) of the needle 300 after being used to make an incision in the lid 112 is cleaned in the needle cleaning bath 108 which is arranged parallel to the operating direction of the reagent transfer mechanism 101. In the subsequent process, the cleaning water is removed at the needle drying port 109 which is arranged parallel to the operating direction of the reagent transfer mechanism 101. Thereby, when an incision is made in the lid 112 of the reagent bottle, the reagent is not diluted with the cleaning water. Here, as illustrated in FIG. 2, the needle cleaning bath 108 and the needle drying port 109 are arranged parallel to the operating direction of the reagent transfer mechanism 101.

The gripper mechanism 106 has hooking claws for gripping the reagent bottle 10 so that the hooking claws are hooked over a hooked portion of the reagent bottle 10 to grip the reagent bottle 10.

The access cover 113 is a cover to prevent the cold air from escaping from the interior of the reagent disk 9 under cool condition, which is kept in closed state at normal times. For access to the reagent disk 9, the reagent transfer mechanism 101 opens the access cover 113 and operates to deliver/remove the reagent bottle 10 into/from the reagent disk 9.

The configuration of the autoloader mechanism 100 has been described.

The following is a description of the operation beginning with a human operator placing a reagent bottle 10 on the reagent loading unit 103 until the reagent bottle 10 is delivered into the reagent disk 9.

Where the human operator intends to deliver a new reagent bottle 10 into the reagent disk 9 of the analyzer, the human operator starts from a first push of a button switch (not shown) of the analyzer. The analyzer recognizes that the first push of the button switch has been performed by the human operator. This causes the reagent loading mechanism 102 to operate to actuate the reagent loading unit 103 from the standby position to be moved toward the front of the analyzer (on the lower side of FIG. 2).

After the reagent loading unit 103 reaches the front of the analyzer, the human operator places the reagent bottle 10 on the reagent loading unit 103. After a required number of reagent bottles 10 is placed on the reagent loading unit 103, the human operator pushes the button switch again.

After recognition that the human operator has pushed the button switch, the reagent loading unit 103 moves to a position under the reagent-bottle lid opening mechanism 104. Then, the reagent-bottle lid opening mechanism 104 moves down toward the lid 112 of the reagent bottle 10 to incise the lid 112 with the needle body 105 to the extent that the reagent probe 7a, 8a can be inserted. After incising the lid 112 of the reagent bottle 10, the reagent-bottle lid opening mechanism 104 moves up, and the reagent transfer mechanism 101 moves to the position of the needle cleaning bath 108 in order to clean the needle body 105, so that the needle body 105 is cleaned. Then, the reagent transfer mechanism 101 moves to the needle drying port 109 and performs drying of the needle body 105.

After drying, the reagent loading mechanism 102 actuates the reagent loading unit 103 to move the reagent bottle 10 with incision to a position under the gripper mechanism 106. Subsequently, the gripper mechanism 106 moves down to catch hold of the reagent bottle 10, and then the access cover 113 is opened. Subsequently, the gripper mechanism 106 moves upward and also moves to a position of the opened access cover 113, and then delivers the transferred reagent bottle 10 to a vacant position of the reagent disk 9. After delivery, the gripper mechanism 106 is returned to the position of the reagent loading unit 103 again.

The above operation is performed repeatedly on all the reagent bottles 10 loaded on the reagent loading unit 103 and required to be delivered into the reagent disk 9. After all the reagent bottles 10 loaded on the reagent loading unit 103 and required to be delivered have been delivered into the reagent disk 9, the access cover 113 is closed.

The piercing operation performed on the lid 112 of the reagent bottle 10 and the delivery operation to the reagent disk 9 after the reagent bottle 10 has been placed in the autoloader mechanism 100 have been described.

Where the reagent placed in the reagent disk 9 has run out, the reagent bottle 10 is removed by following the procedure below. Removing the reagent bottle 10 may be carried out at any time during analysis, after the completion of the last dispensing process of the reagent dispensing mechanism 7, 8 or after the output of analysis result.

Initially, the controller 21 opens the access cover 113. Also, the reagent transfer mechanism 101 moves to a position of the opened access cover 113. Then, the empty reagent bottle 10 is gripped by the gripper mechanism 106. In tandem with this, the reagent loading unit 103 moves from its standby position and stops at a position where a vacant reagent-bottle slot of the reagent loading unit 103 reaches under the trajectory of the gripper mechanism 106.

Then, while the empty reagent bottle 10 is gripped by the griper mechanism 106, the reagent transfer mechanism 101 moves to a position of the reagent loading mechanism 102. In tandem with this, the access cover 113 is closed. Subsequently, the gripper mechanism 106 sets the empty reagent bottle 10 into the vacant reagent-bottle slot of the reagent loading unit 103. Subsequently, the reagent loading mechanism 102 returns to its standby position.

Subsequently, the human operator is notified that the empty reagent bottle 10 can be unloaded. Upon reception of the notification, the human operator unloads the empty reagent bottle 10 from the analyzer.

Also, where the reagent bottles 10 are placed in all the reagent slots of the reagent loading unit 103, and where a reagent bottle 10 placed in the reagent disk 9 has run out and is required to be discharged from the analyzer, a single or several vacant reagent slot(s) more than the capacity of the reagent disk 9 may be provided. Then, the reagent bottle 10 placed on the reagent loading unit 103 is delivered into the reagent disk 9 before the lid 112 is incised. Then, an empty reagent bottle 10 is gripped by the griper mechanism 106 to be put on the reagent loading unit 103, and then the human operator removes the empty reagent bottle 10. After removal, the reagent bottle 10 without incision placed on the reagent disk 9 can be placed back to the vacant reagent slot. As long as a vacant slot is provided in the reagent loading unit 103, a similar operation is possible.

Here, the piercing operation to pierce the lid 112 with the needle body 105 involves making an incision in the center of the lid 112. The reasons will be described below with reference to FIG. 3 to FIG. 6.

Figure 3:
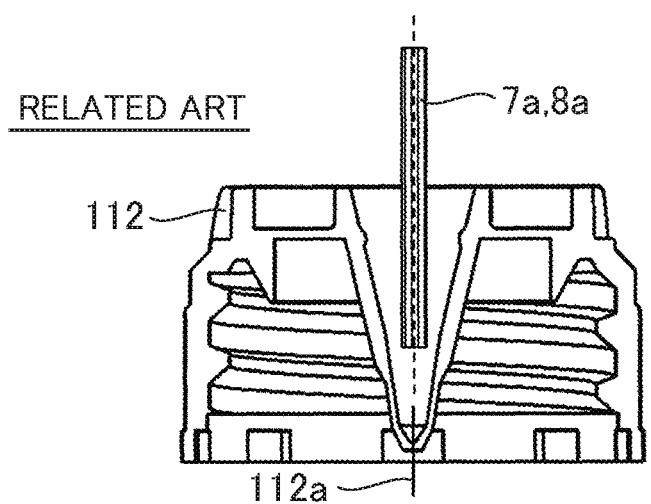
FIG. 3 is a diagram representing that a probe can dispense without bending if an incision is made at the center of a lid of a reagent bottle in a commonly used automatic analyzer.
Figure 4:
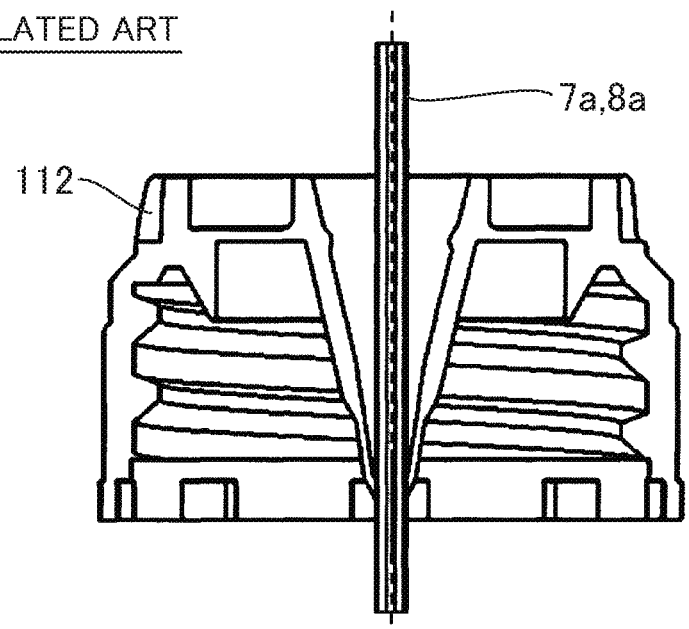
FIG. 4 is a diagram representing that a probe can dispense without bending if an incision is made at the center of a lid of a reagent bottle in a commonly used automatic analyzer.
Figure 5:
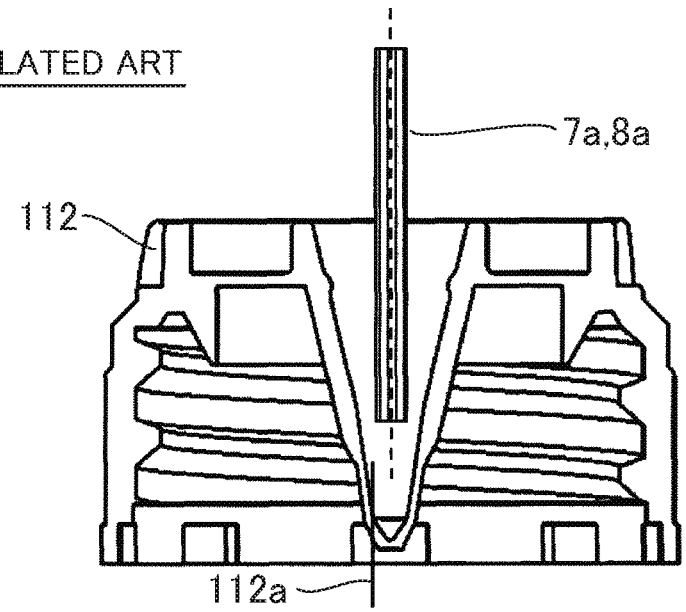
FIG. 5 is a diagram representing that a probe is caused to bend due to an incision not made at the center of a lid of a reagent bottle in a commonly used automatic analyzer.
Figure 6:
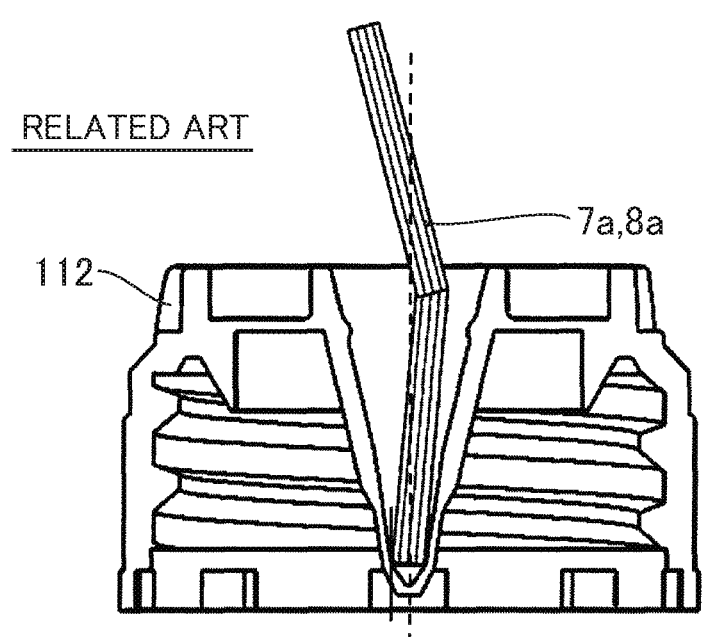
FIG. 6 is a diagram representing that a probe is caused to bend due to an incision not made at the center of a lid of a reagent bottle in a commonly used automatic analyzer.

Although having been described, in the operation of the reagent probe 7a, 8a, the reagent probe 7a, 8a is inserted through the lid 112 at high speed. Because of this, as long as an incision 112a of lid 112 is made at the center of the lid 112 as illustrated in FIG. 3, the reagent probe 7a, 8a normally passes through the center as illustrated in FIG. 4. Contrarily, if the incision 112a of lid 112 is offset from the center of the lid 112 as illustrated in FIG. 5, the distal end of the reagent probe 7a, 8a maybe easily caught on the lid 112, and in the worst scenario, there is a risk of bending the reagent probe 7a, 8a.

Also, the reagent probe 7a, 8a used in recent years has a nozzle diameter of the order of 1 mm, and has a lower buckling strength. Therefore, the lid 112 is pierced at its center and, in order to repeat the operation of the reagent probe 7a, 8a being inserted through the lid 112 and then ejecting the reagent, the reagent probe 7a, 8a is required to be cleaned for use over an extended time period. For this purpose, damage to the reagent probe 7a, 8a such as by being caught and/or the like should be avoided as much as possible.

Figure 7:
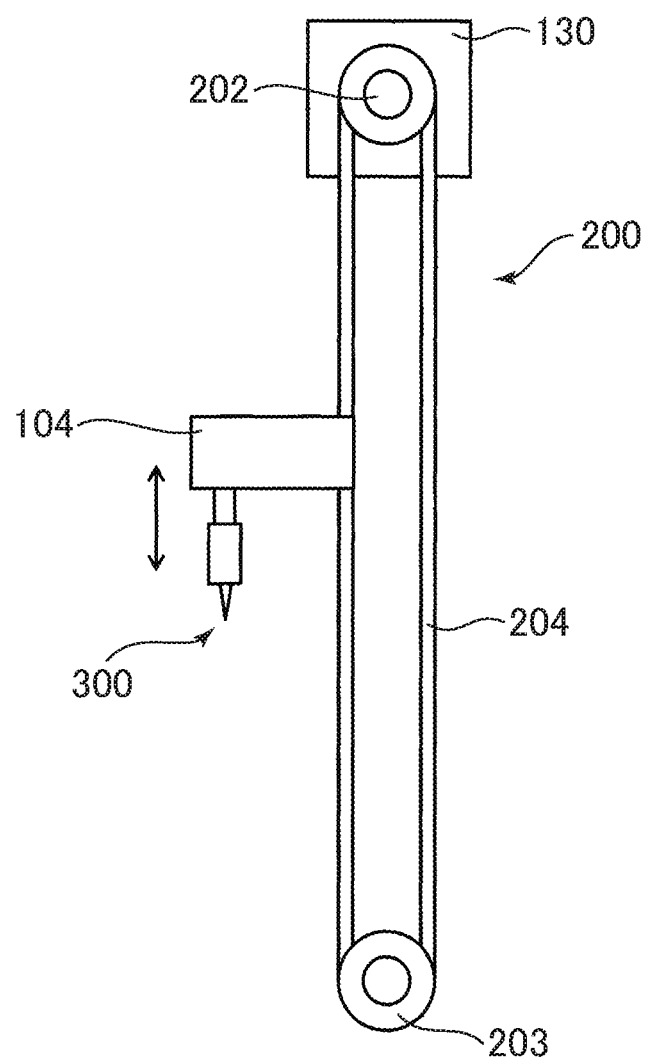
FIG. 7 is a schematic diagram illustrating the configuration of a mechanism to lift up/down a reagent-bottle lid opening mechanism installed in an automatic analyzer in accordance with the embodiment.

Given these circumstances, in the automatic analyzer in accordance with the embodiment, the reagent-bottle lid opening mechanism 104 has an aligning mechanism for adjusting a position of the needle body 105 of the needle 300 with respect to the lid 112 such that the needle body 105 of the needle 300 is able to stick in the center of the lid 112 with high reproducibility to make an incision-like hole. The configuration and operation of the reagent-bottle lid opening mechanism 104 and the aligning mechanism will now be described with reference to FIG. 7 to FIG. 23. FIG. 7 illustrates the configuration for vertically moving the reagent-bottle lid opening mechanism 104.

As illustrated in FIG. 7, the vertical drive motor 130, a pulley 202 rotated along with the vertical drive motor 130, a pulley 203 paired with the pulley 202, and a belt 204 connected to the pulley 202 and the pulley 203 are provided. The reagent-bottle lid opening mechanism 104 is connected to the belt 204. Because of this, driving the vertical drive motor 130 causes vertical movement of the reagent-bottle lid opening mechanism 104.

Note that, although the description is given using the figure in which the vertical drive motor 130 is placed in a upper portion, the pulley 202 is placed in a lower portion and the reagent-bottle lid opening mechanism 104 is mounted on the belt 204, the configuration of operation achieved by vertically moving the reagent-bottle lid opening mechanism 104 is not limited to the configuration in FIG. 7. For example, even in a configuration using a ball screw or a spline shaft, the lid 112 is able to be pierced by moving the needle body 105 in the vertical direction.

Figure 8:
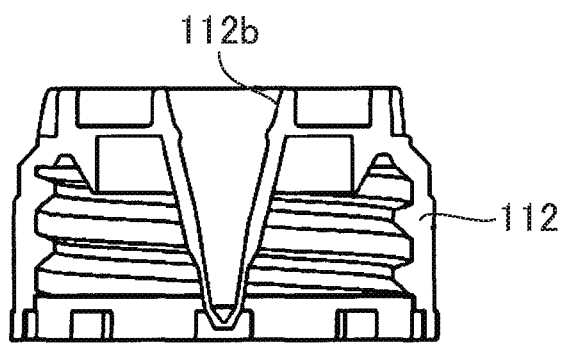
FIG. 8 is a schematic diagram of the lid of a reagent bottle.
Figure 9:
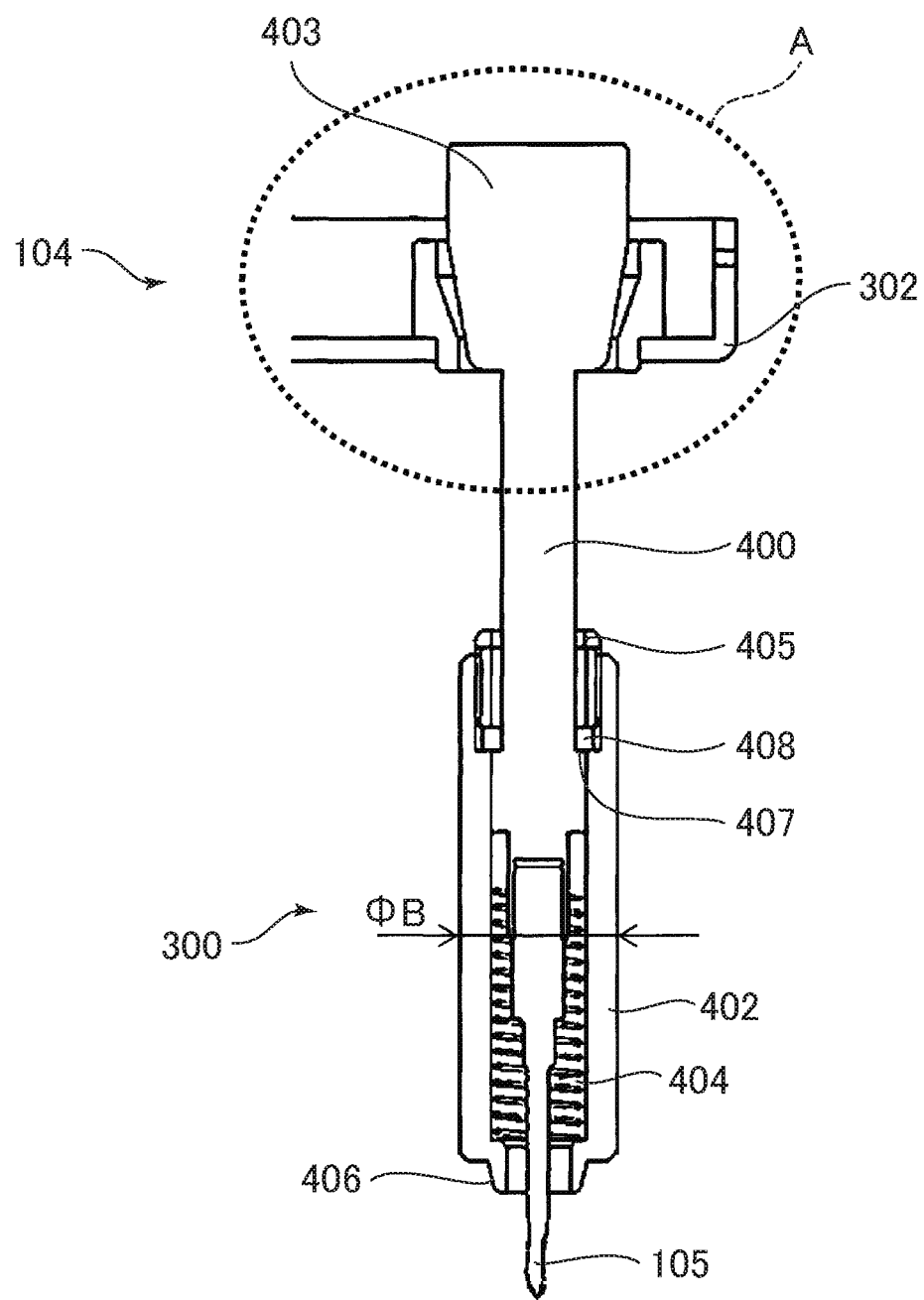
FIG. 9 is a schematic diagram of the reagent-bottle lid opening mechanism in the automatic analyzer in accordance with the embodiment.
Figure 10:
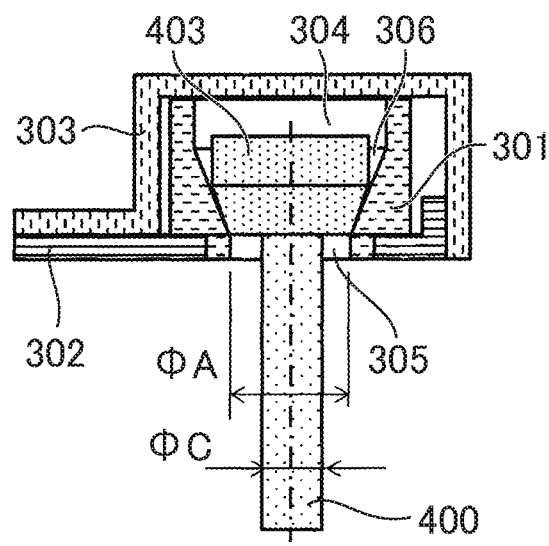
FIG. 10 is an enlarged view of a region A in FIG. 9.

The structure of the reagent-bottle lid opening mechanism 104 and the structure of the lid 112 of the reagent bottle 10 will now be described with reference to FIG. 8 to FIG. 10. FIG. 8 is a schematic sectional view of the lid 112 of the reagent bottle 10. FIG. 9 is a schematic diagram of the reagent-bottle lid opening mechanism 104. FIG. 10 is an enlarged view of a region A in FIG. 9.

As illustrated in FIG. 8, the lid 112 of the reagent bottle 10 has a lid taper (tapered portion) 112b formed to guide the needle 300 to the center of the lid 112.

As illustrated in FIG. 9 and FIG. 10, the reagent-bottle lid opening mechanism 104 includes the needle 300 and the aligning mechanism for adjusting a position of the needle body 105 of the needle 300 with respect to the lid 112 such that the needle body 105 sticks in the center of the lid 112. The aligning mechanism includes a piercer stopper 403 and a piercer supporter holding the piercer stopper 403.

The piercer supporter includes: a piercer support 301 in contact with the piercer stopper 403; a support plate 302 supporting the piercer support 301; and a retaining plate 303 secured to the support plate 302, the retaining plate 303 limiting the amount of travel of the piercer stopper 403 in a parallel direction when the piercer stopper 403 moves relative to the piercer supporter in the parallel direction.

The needle 300 has: the needle body 105 to stick in the lid 112; a piercer shaft 400; a piercer guide 402; a spring 404; and a washer 408.

The needle body 105 is incorporated in a distal end of the piercer shaft 400, while the piercer stopper 403 with a larger diameter than that of the needle body 105 is incorporated in the other end. The piercer guide 402 is attached on the needle-body 105 side of the piercer shaft 400 so as to cover most of the needle body 105. The needle 300 has a tapered portion 406 on the downward side of the piercer guide 402, the tapered portion 406 being formed capable of ensuring a mutual fit to the lid taper 112b of the lid 112 of the reagent bottle 10. The spring 404 is incorporated in the piercer guide 402. The needle body 105 is structured to be able to operate in the vertical direction by extension/contraction of the spring 404, in which the spring 404 contracts upon occurrence of contact between the piercer stopper 403 and the retaining plate 303, so that the needle body 105 juts out the piercer guide 402 to come into contact with the lid 112.

The piercer stopper 403 is machined into a tapered shape. Also, the piercer support 301 mounted on the support plate 302 is also formed in a tapered shape. The piercer stopper 403 and the piercer support 301 are arranged to be fitted with each other. The piercer stopper 403 is capable of moving a length corresponding to a clearance 304, relative to the piercer support 301 in the vertical direction, and also capable of moving lengths corresponding to clearances 305, 306 in the lateral direction. Because of this, the needle 300 can move relative to the piercer support 301 in the lateral direction as a pendulum. Also, when any force does not act, the needle 300 is automatically moved relative to the piercer support 301 back to its original position by self-weight.

The following description is of the movable range of the piercer guide 402 vertically moving relative to the needle body 105. The amount of upward travel of the piercer guide 402 is until the spring 404 is completely compressed, and the amount of downward travel is until a stopper 405 formed integrally with the piercer guide 402 comes into contact with a step height 407 of the piercer shaft 400. For the amounts of upward and downward travels, after the tapered portion 406 of the piercer guide 402 is positioned on the lid taper 112b of the lid 112, the amount of vertical movement until the needle body 105 passes through the lid 112 may be ensured, and the upward movement of the pierce guide 402 is not needed until the spring 404 is compressed completely. For example, if a stopper (not shown) is provided in the piercer shaft 400 or the like, and the stopper is configured to come into contact with the piercer guide 402, this makes it possible to avoid damage to the spring 404.

Here, the diameter $\phi A$ of the opening of the piercer support 301 and the diameter $\phi B$ of the piercer guide 402 desirably satisfy the relationship:

$$\phi A > \phi B \quad (1)$$

Satisfying relational expression (1) facilitates attaching/detaching of the needle 300 when it needs replacing because of occurrence of an abnormal condition of wearing out of the needle body 105 and/or the like, thus achieving improvement in maintenance and simplification of component replacement.

Note that, even in the case $\phi A < \phi B$, assuming that D is the amount of offset between the central axis of the lid 112 and the central axis of the needle body 105 and $\phi C$ is the diameter of the piercer shaft 400, satisfying the relational expression $$D \leq \phi A - \phi C \quad (2)$$

makes automatic alignment possible.

Also, in addition to the clearance 305 ($\phi A - \phi C$) between the opening formed in the piercer support 301 and the piercer shaft 400 of the needle 300, the clearance 306 between the side face of the piercer stopper 403 and the side face of the piercer support 301 is set to be greater than a difference D between the central axis of the lid 112 and the central axis of the needle 300.

The effects of expression (1) and expression (2) will be described with reference to FIG. 11 and subsequent figures.

The structure of the reagent-bottle lid opening mechanism 104 and the operation to make an incision-like hole in the lid 112 of the reagent bottle 10 will now be described with reference to FIG. 11 to FIG. 17. FIGS. 11 to 17 illustrate an example case where the central axis of the needle body 105 and the central axis of the lid 112 are misaligned before the lid 112 is pierced.

FIGS. 11 to 17 are explanatory drawings for achieving the piercing operation to pierce a hole in the center of the lid 112 with high reproducibility if the central axis of the needle body 105 and the central axis of the lid 112 are misaligned before the lid 112 is pierced with the needle body 105.

The causes of a misalignment between the central axis of the needle body 105 and the central axis of the lid 112 are manifold, such as variations in adjustment when each component is mounted, variations in size of components themselves, variations in size of the reagent bottles 10 and the lids 112, variations in position of the reagent bottle 10 being placed in the reagent loading unit 103 before a hole is pierced with the needle body 105, and the like. However, machining components to closer tolerances causes an increase in cost. Further, it is extremely difficult in practice to consume much time to make adjustment for avoidance of variations. To address this, the reagent-bottle lid opening mechanism 104 including an aligning mechanism as described in the embodiment is most useful.

Figure 11:
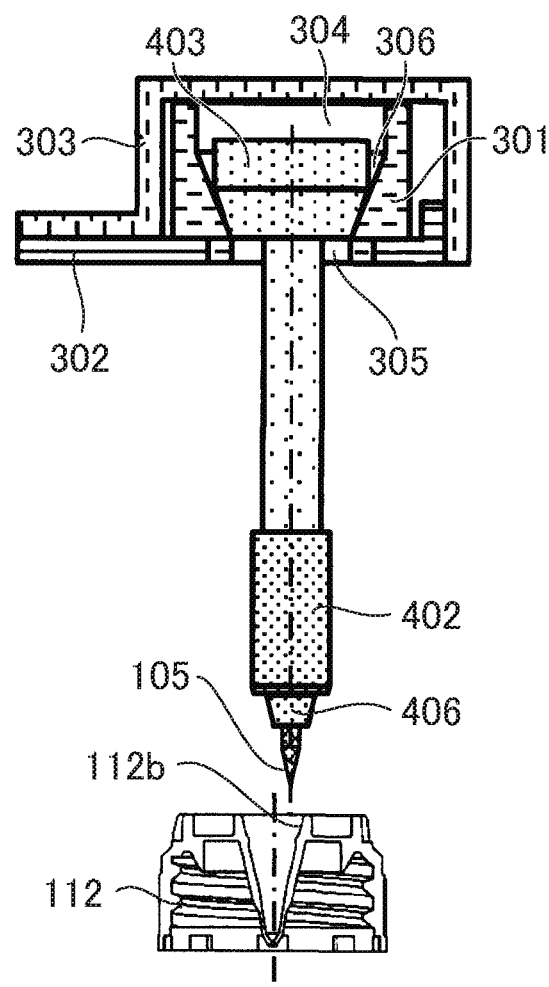
FIG. 11 is a flow diagram illustrating the operation to pierce a lid of a reagent bottle with a needle.
Figure 12:
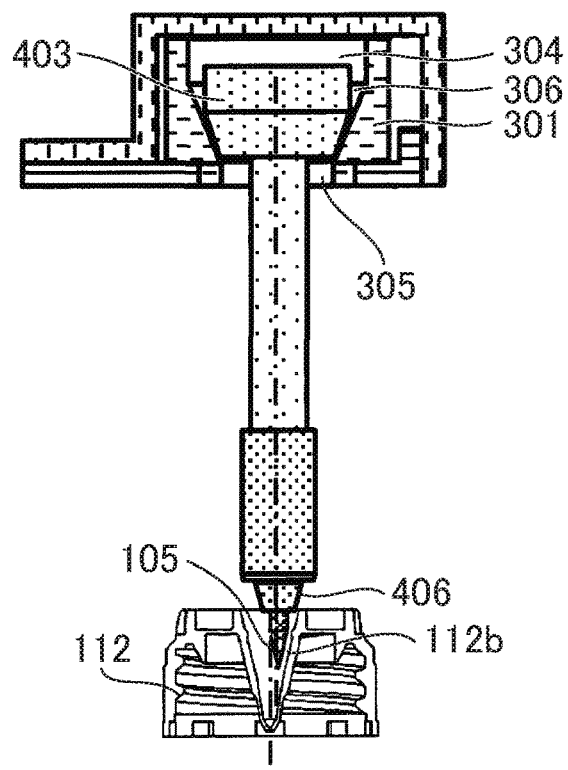
FIG. 12 is a flow diagram illustrating the operation to pierce the lid of the reagent bottle with the needle.

Initially, the reagent-bottle lid opening mechanism 104 is moved down from the state as illustrated in FIG. 11 to pierce the lid 112. Then, as illustrated in FIG. 12, rather than the needle body 105, the tapered portion 406 formed on the piercer guide 402 of the needle 300 comes first into contact with the lid taper 112b of the lid 112. Because the mutual components have a tapered shape, the taper shapes serve as a guide so that the tapered portion 406 is directly inserted gradually toward the center of the lid taper 112b.

Figure 13:
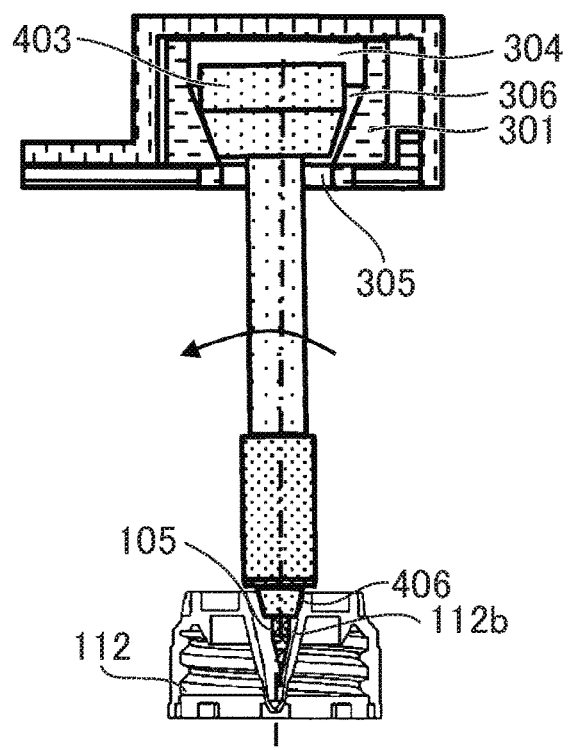
FIG. 13 is a flow diagram illustrating the operation to pierce the lid of the reagent bottle with the needle.

However, because of misalignment between the central axis of the needle body 105 and the central axis of the lid 112, as the reagent-bottle lid opening mechanism 104 moves further down, the piercer stopper 403 follows the tapered portion of the piercer support 301 as illustrated in FIG. 13, so that the needle 300 is inclined toward the left of FIG. 13 using the clearance 305 and the clearance 306, and the piercer stopper 403 moves upward along the tapered surface of the piercer support 301 using the clearance 304 and the clearance 306.

Figure 14:
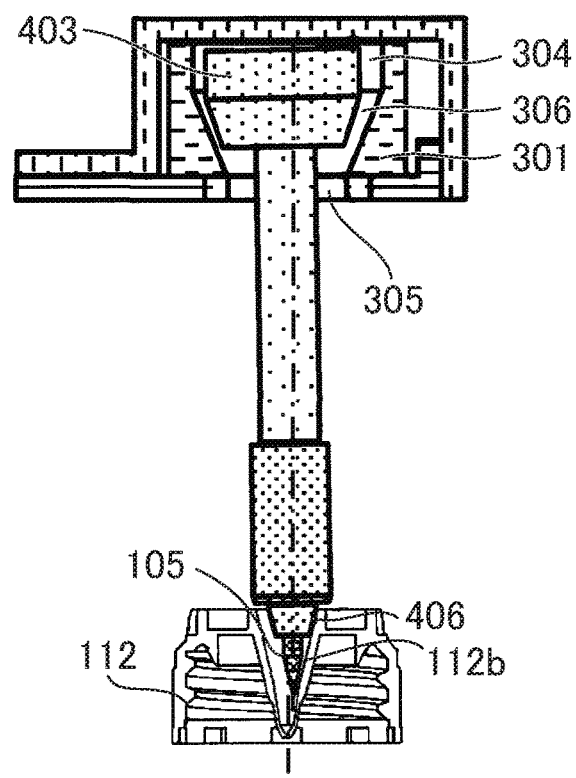
FIG. 14 is a flow diagram illustrating the operation to pierce the lid of the reagent bottle with the needle.

As the reagent-bottle lid opening mechanism 104 further moves downward, the top surface of the piercer stopper 403 comes into contact with the retaining plate 303 as illustrated in FIG. 14.

Figure 15:
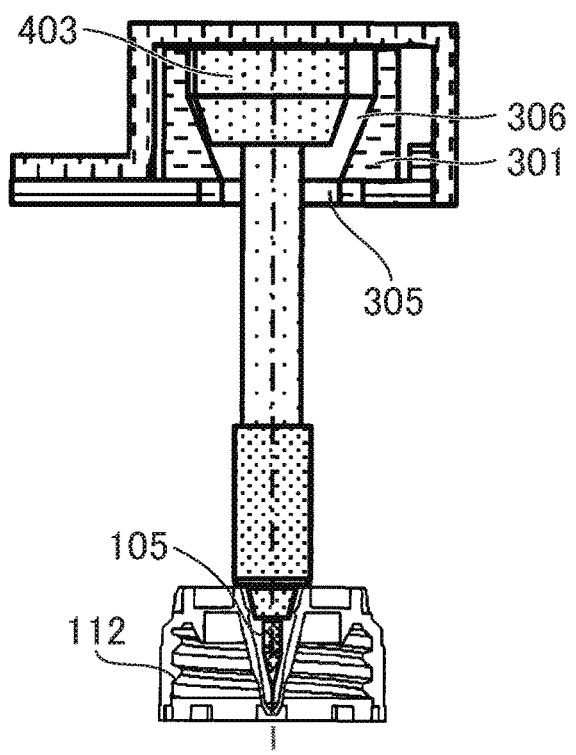
FIG. 15 is a flow diagram illustrating the operation to pierce the lid of the reagent bottle with the needle.

As the reagent-bottle lid opening mechanism 104 moves further downward, the tapered portion 406 comes into intimate contact with the lid taper 112b as illustrated in FIG. 15. By such motions, the central axis of the needle body 105 is automatically adjusted so as to align the central axis of the lid 112 and the central axis of the needle body 105 with each other.

The configuration based on the above relational expression (2) is desirable in order to perform automatic alignment between the central axis of the lid 112 and the central axis of the needle body 105 in an automatic manner as described above. Even if signs in relational expression (2) are inverted, alignment is possible. However, when lateral movement over a length corresponding to the amount of offset D between the central axis and the central axis of the needle body 105 is about to be made, contact of points except required points may possibly occur, raising the possibility of constituting an obstacle to smooth alignment. As a result, the configuration to satisfy relational expression (2) is desirable.

As the reagent-bottle lid opening mechanism 104 moves further downward, the spring 404 starts being compressed while the state of intimate contact between the piercer guide 402 and the lid 112 is held, so that the piercer stopper 403 moves upward the distance 304 to come into intimate contact with the retaining plate 303.

Figure 16:
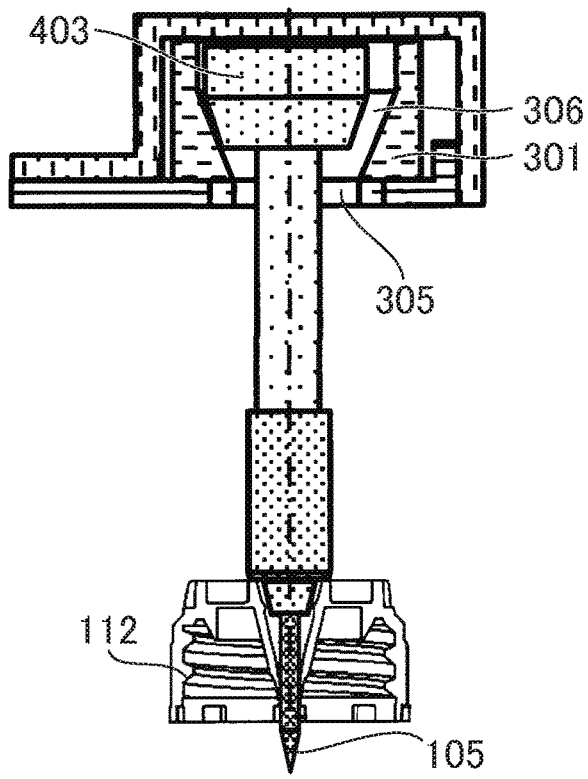
FIG. 16 is a flow diagram illustrating the operation to pierce the lid of the reagent bottle with the needle.

As illustrated in FIG. 16, as the reagent-bottle lid opening mechanism 104 moves further downward, the needle body 105 comes into contact with the lid 112 so that an incision 112a is made in the lid 112, thus piercing.

Figure 17:
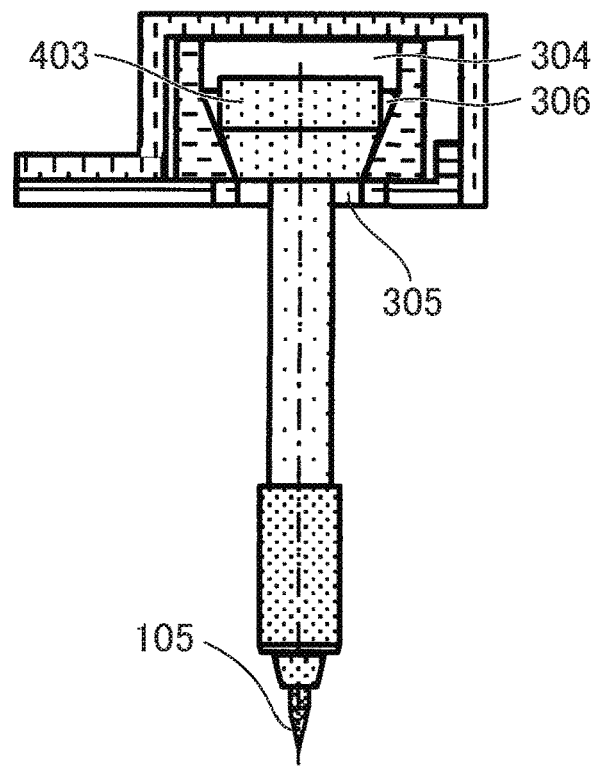
FIG. 17 is a flow diagram illustrating the operation to pierce the lid of the reagent bottle with the needle.

After the completion of piercing, the reagent-bottle lid opening mechanism 104 moves up. This causes the needle body 105 to move away from the lid 112. Also, because the constituent components such as the piercer guide 402 and the like are placed in a lower section and the piercer stopper 403 and the piercer support 301 are provided with the tapered portion, the piercer stopper 403 can move along the tapered surface of the piercer support 301, and the needle body 105 can use its own weight to return to the vertical placement with high reproducibility, as illustrated in FIG. 17. Therefore, the piercing operation can be repeatedly performed on the lids 112 while alignment is automatically performed.

Figure 18:
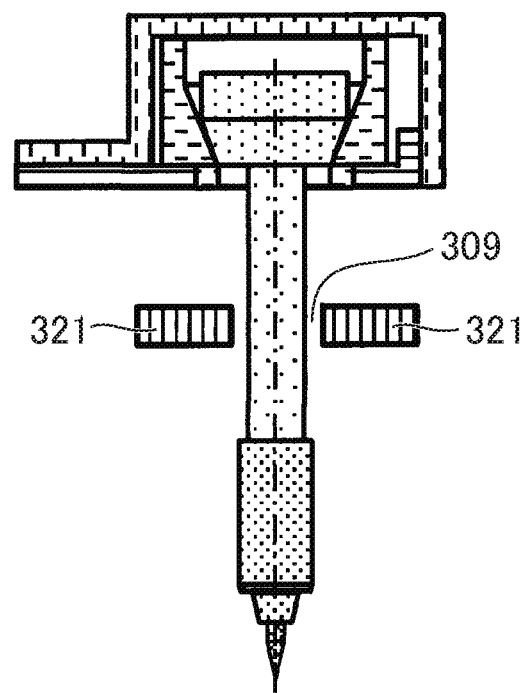
FIG. 18 is a schematic diagram of another example reagent-bottle lid opening mechanism.

Note that, as illustrated in FIG. 18, a piercer shaft guide 321 may be placed to correct the inclination of the entire needle body 105. In this case, a clearance 309 may be desirable created between the piercer shaft guide 321 and the piercer shaft 400 to permit an inclination to a degree.

Note that the aligning mechanism of the needle 300 is not limited to an aspect as illustrated in FIG. 9 and FIG. 10, and may have a structure capable of automatically performing alignment and piercing the lid 112. Other aspects will be described below with reference to FIG. 19 to FIG. 23. FIGS. 19 to 23 are schematic diagrams other example reagent-bottle lid opening mechanisms.

Figure 19:
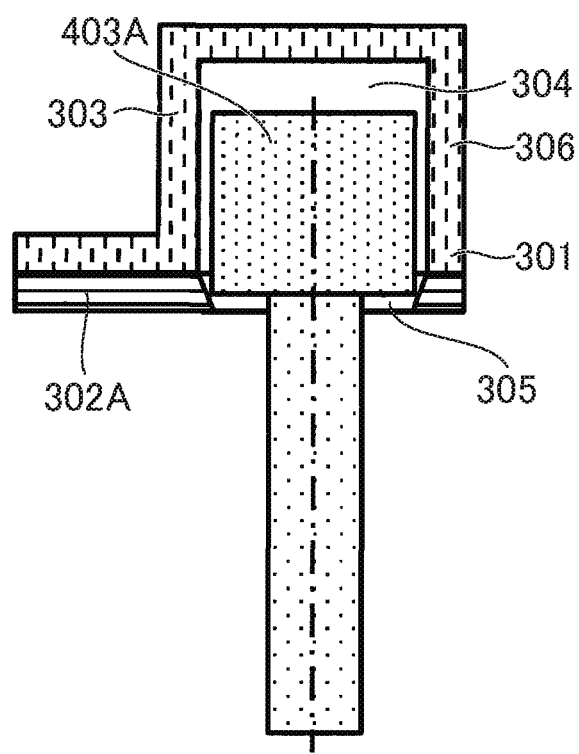
FIG. 19 is a schematic diagram of still another example reagent-bottle lid opening mechanism.

For example, as illustrated in FIG. 19, only an opening of a support plate 302A may be formed in a tapered shape, and a piercer stopper 403A may be formed in a block shape. In this case, the support plate 302A with a tapered shape is configured to cause the piercer stopper 403A to be movable relative to the support plate 302A in the vertical and lateral directions. Because of this, in the piercing process, the central axis of the lid 112 and the central axis of the needle body 105 can be automatically aligned.

Figure 20:
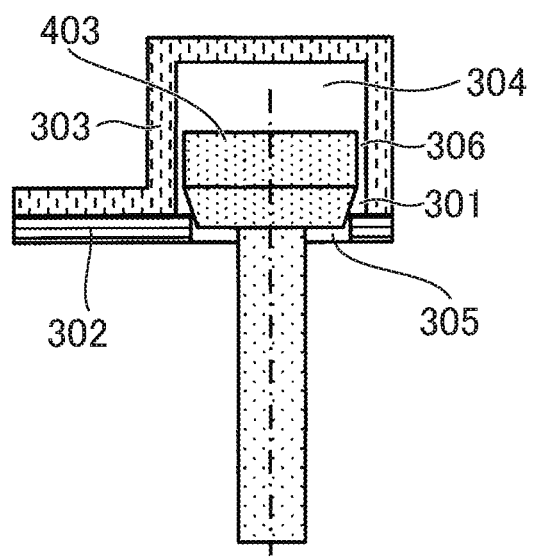
FIG. 20 is a schematic diagram of still another example reagent-bottle lid opening mechanism.

Further, as illustrated in FIG. 20, the piercer support 301 may not have a tapered shape and only the piercer stopper 403 may have a tapered shape. In this case, also, because of the piercer stopper 403 with a tapered shape, the piercer stopper 403 can move relative to the support plate 302 in the vertical and lateral directions, so that in the piercing process, the central axis of the lid 112 and the central axis of the needle body 105 can be automatically aligned.

Figure 21:
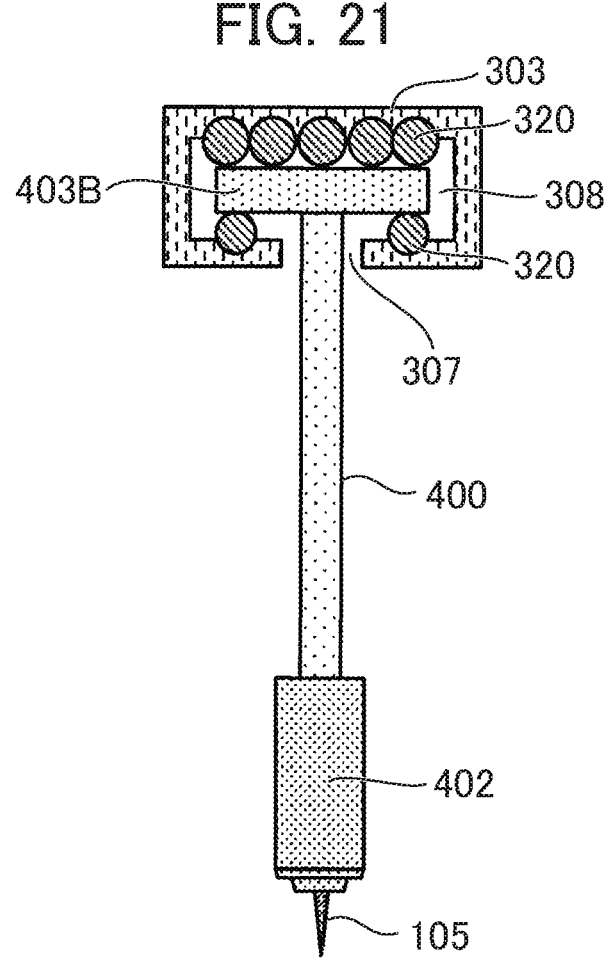
FIG. 21 is a schematic diagram of still another example reagent-bottle lid opening mechanism.

Further, as illustrated in FIG. 21, a plurality of balls 320 may be fixed to the retaining plate 303 on the upper and lower sides of a piercer stopper 403B, and the piercer shaft 400 and piercer stopper 403 may be structured to slide in the lateral direction respectively within the clearance 307 and the clearance 308. Even in such structure, automatic alignment between the central axis of the lid 112 and the central axis of the needle body 105 is possible.

Figure 22:
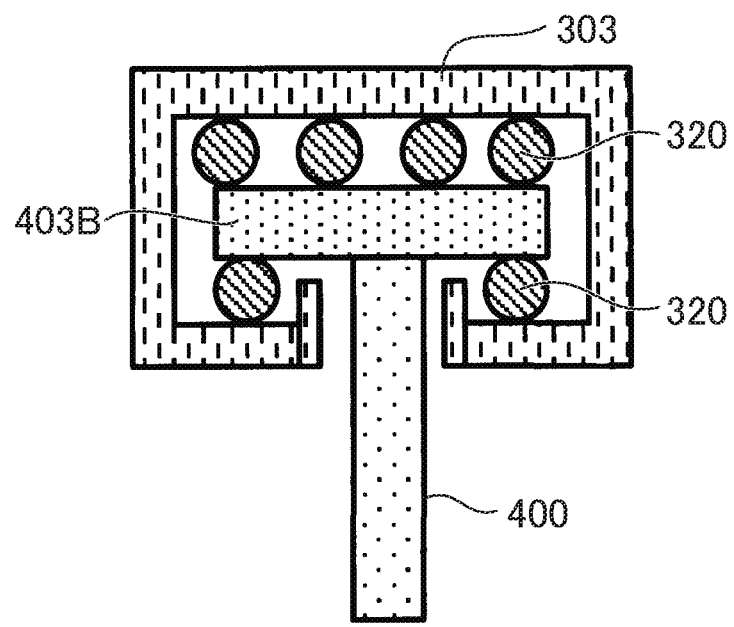
FIG. 22 is a schematic diagram of still another example reagent-bottle lid opening mechanism.

In the description in FIG. 21, an example of using the five balls 320 in an upper portion and the two balls 320 in a lower portion is described. However, the number of balls is not limited to the number shown in FIG. 21, because what is required is that the piercer stopper 403B may laterally move smoothly. Also, for a method of fixing the balls 320, the structure that the balls are fixed to the retaining plate 303 on the upper and lower sides of the piercer stopper 403B is not intended to be limiting. As illustrated in FIG. 22, in one possible structure, the balls 320 of the size fitting in the space between the retaining plate 303 and the piercer stopper 403B may be placed and the balls 320 may move concurrently with a lateral motion of the piercer stopper 403B.

Figure 23:
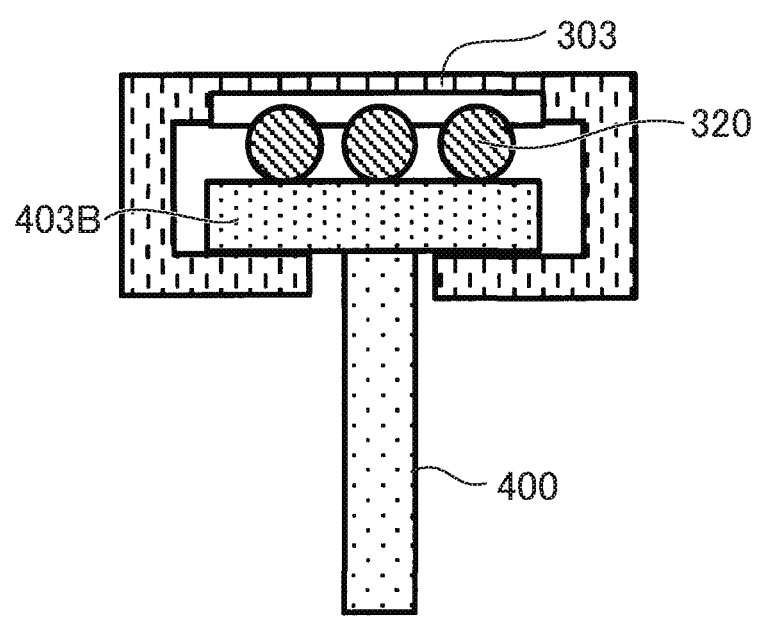
FIG. 23 is a schematic diagram of still another example reagent-bottle lid opening mechanism.

Further, in one possible structure as illustrated in FIG. 23, the balls 320 may be placed only on the upper side of the piercer stopper 403B and the piercer stopper 403 may move laterally after the piercer stopper 403B together with the balls 320 is lifted up after occurrence of the contact with the lid 112.

Advantageous effects of the embodiment will be described below.

In the above-described embodiment of the automatic analyzer according to the present invention, the reagent-bottle lid opening mechanism 104, which has the needle 300 for piercing the lid 112 of the reagent bottle 10 to be delivered to the reagent disk 9, has the aligning mechanism for adjusting the position of the needle 300 with respect to the lid 112 such that the needle body 105 of the needle 300 sticks in the center of the lid 112.

As described above, the operation of each mechanism in the automatic analyzer is faster in step with an improvement in processing speed of the analyzer, and therefore the reagent probes 7a, 8a also operate faster than ever before. The reagent probe 7a, 8a moves down at high speed into a small hole formed by making an incision 112a in the lid 112 of the reagent bottle 10 and performs the suction operation. Therefore, if the incision 112a of the lid 112 of the reagent bottle 10 is not made at the center of the lid 112 with accuracy, this may possibly cause the failure of the reagent probe 7a, 8a. The need for repeatedly piercing the centers of the lids 112 with high accuracy therefore arises in providing a high-reliability analyzer.

With the configuration as described above, in the automatic analyzer according to the embodiment, even if the center of the lid 112 of the reagent bottle 10 and the center of the needle body 105 are offset from each other, alignment is automatically performed to align the center axis of the needle body 105 with the center axis of the lid 112, and after the alignment, the piercing operation is performed. Accordingly, it is made possible to repeat piercing the centers of the lids 112 of the reagent bottles 10 with high accuracy. Thus, dispensing the reagent with the reagent probes 7a, 8a can be repeatedly performed at high speeds with precision, achieving improved throughput of the automatic analyzer.

Also, the aligning mechanism is provided at the opposite end of the needle 300 from the needle body 105, and has the piercer stopper 403 with a larger diameter than the needle body 105, and the piercer supporter supporting the piercer stopper 403. The piercer stopper 403 is supported on the piercer supporter in such a manner that the piercer stopper 403 is movable in a direction perpendicular to and in a direction parallel to the central axis of the needle 300, so that the piercer stopper 403 can be freely moved relative to the piercer supporter in the vertical and lateral directions. Because of this, alignment is automatically performed to align the central axis of the needle body 105 with the central axis of the lid 112, and this makes it possible to repeat piercing the center of the lid 112 of the reagent bottle 10 with high accuracy.

Further, at least one of the piercer supporter and the piercer stopper 403 of the aligning mechanism is formed in a tapered shape. This enables smooth aligning operation so that an incision 112a can be properly and repeatedly made at the center of the lid 112.

The piercer supporter has: the tapered-shaped piercer support 301 in contact with the piercer stopper 403; the support plate 302 supporting the piercer support 301; and the retaining plate 303 secured to the support plate 302, the retaining plate 303 limiting the amount of travel of the piercer stopper 403 in the parallel direction when the piercer stopper 403 moves relative to the piercer supporter in the parallel direction. The clearance between the opening and the needle 300 and the clearance between the side face of the piercer stopper 403 and the side face of the piercer support 301 are each greater than the difference between the central axis of the lid 112 and the central axis of the needle 300. This enables prevention of contact of undesired points during alignment to achieve smoother alignment.

Further, the needle 300 has: the needle body 105 to stick in the lid 112; the piercer shaft 400 supporting the needle body 105; the piercer guide 402 covering the needle body 105; and the spring 404 placed within the piercer guide 402 and pressing the needle body 105 toward the piercer shaft 400. Upon contact between the piercer stopper 403 and the retaining plate 303, the spring 404 contracts and the needle body 105 comes into contact with the lid 112. This inhibits the needle body 105 from making more contact with the lid 112 than necessary. This enables a reduction in damage to the needle body 105, and therefore the high-accurate piercing operation over the long term.

Also, the lid 112 of the reagent bottle 10 has the lid taper 112b and the piercer guide 402 has the tapered portion 406. The lid taper 112b of the lid 112 and the tapered portion 406 of the piercer guide 402 allow the needle 300 to be positioned to stick in the center of the lid 112. Thus, those tapers serve as a guide for smooth alignment, and therefore the alignment is able to be performed with ease and with reliability.

Further, the needle 300 automatically moves back to its original positon after piercing of the lid 112, so that the needle 300 does not remain in the state in which the central axis is offset. This enables repeated smooth alignment.

Further, the automatic analyzer includes: the reagent loading unit 103 for placing the reagent bottle 10 when the reagent bottle 10 is entered into the automatic analyzer; and the reagent transfer mechanism 101 for transferring the reagent bottle 10 placed in the reagent loading unit 103 into the reagent disk 9, the reagent transfer mechanism 101 having the gripper mechanism 106 catching hold of the reagent bottle 10 and the reagent-bottle lid opening mechanism 104. Thereby, there is no need for the human operator to enter the reagent bottle 10 directly into the reagent disk 9 and also the processes from opening of the lid of the reagent bottle 10 to delivery to the reagent disk 9 are automatically performed, so that the burden of the human operator can be reduced.

It should be understood that the present invention is not limited to the above-described embodiments and various modifications, applications are possible. The above-described embodiments have been described in detail for the purpose of explaining the present invention clearly, and the present invention is not necessarily limited to including all the components and arrangement described above.

For example, the instance where the distal end of the needle body 105 is exposed on the outside of the piercer guide 402 at all times has been described, but the positional relationship between the needle body 105 and the piercer guide 402 is determined by a height from the top surface of the lid 112 to an incision site, a shape and/or an angle of the lid taper 112b, and/or a shape of the tapered portion 406 fitting into that of the lid taper 112b. Therefore, the above-embodiments are not intended to be limiting.

Further, the needle body 105 has been described as a single needle body, but where the reagent bottle 10 has two lids, it is possible to configure such that two needle bodies 105 are mounted and the two lids are simultaneously pierced by a moving-down operation of the reagent-bottle lid opening mechanism 104. Further, the two needle cleaning baths 108 and the two needle drying ports 109 may be arranged at an interval between the needle bodies 105. This makes it possible for each needle body 105 to be both cleaned and dried by once vertical movement, and the length of time for delivery can be reduced.

LIST OF REFERENCE SIGNS

1 . . . Reaction disk
2 . . . Reaction container
3 . . . Cleaning mechanism
4 . . . Spectrophotometer
4a . . . Light source
5, 6 . . . Agitation mechanism
7, 8 . . . Reagent dispensing mechanism
7a, 8a . . . Reagent probe
9 . . . Reagent disk
10 . . . Reagent bottle
11 . . . Sample dispensing mechanism
11a . . . Sample probe
13 . . . Cleaning bath
15 . . . Sample container
16 . . . Rack
17 . . . Sample transfer mechanism
18 . . . Reagent syringe
19 . . . Sample syringe
20 . . . Cleaning pump
21 . . . Controller
30, 31, 32, 33 . . . Cleaning bath
100 . . . Autoloader mechanism
101 . . . Reagent transfer mechanism (reagent transfer unit)
102 . . . Reagent loading mechanism (transfer line)
103 . . . Reagent loading unit
104 . . . Reagent-bottle lid opening mechanism (reagent-bottle lid opening unit)
105 . . . Needle body
106 . . . Griper mechanism (gripper unit)
108 . . . Needle cleaning bath
109 . . . Needle drying port
111 . . . Suction port
112 . . . Lid
112a . . . Incision
112b . . . Lid taper (tapered portion)
113 . . . Access cover
117 . . . Support strut
118 . . . Metal plate
130 . . . Vertical drive motor
131 . . . Horizontal drive motor
202, 203 . . . Pulley
204 . . . Belt
300 . . . Needle
301 . . . Piercer support
302, 302A . . . Support plate
303 . . . Retaining plate
304, 305, 306, 307, 308, 309 . . . Clearance 320 . . . Ball
321 . . . Piercer shaft guide
400 . . . Piercer shaft
402 . . . Piercer guide
403, 403A, 403B . . . Piercer stopper
404 . . . Spring
405 . . . Stopper
406 . . . Tapered portion
407 . . . Step height
408 . . . Washer

The invention claimed is:

1. A reagent bottle lid opening mechanism for use with an automatic analyzer that dispenses a sample and a reagent into each of multiple reaction containers, comprising:
   a reagent disk to hold reagent bottles containing the reagent; and
   a reagent-bottle lid opener comprising:
      a needle assembly comprising a needle body at a first end of the needle assembly to pierce a lid of the reagent bottle which has been entered into the automatic analyzer and is to be delivered to the reagent disk;
      a piercer supporter to adjust a position of the needle body with respect to the lid such that the needle body aligns with a center of the lid during piercing of the lid, wherein the piercer supporter is disposed at a second end of the needle assembly opposite of the needle body, the piercer supporter comprising:
         a piercer stopper with a larger diameter than the needle body,
         a piercer support supporting the piercer stopper such that the piercer stopper is movable in both a perpendicular and a parallel direction to a central axis of the needle assembly, and
         a retaining plate that is arranged above the piercer stopper in a vertical direction and limits the amount of movement of the piercer stopper in the parallel direction.

2. The reagent bottle lid opening mechanism according to claim 1, wherein at least one of the piercer support and the piercer stopper is formed in a tapered shape.

3. The reagent bottle lid opening mechanism according to claim 2, wherein the piercer supporter further comprises:
   the piercer support of a tapered shape in contact with the piercer stopper;
   a support plate supporting the piercer support,
   wherein a clearance between an opening formed in the piercer supporter and the piercer shaft of the needle assembly and a clearance between a side face of the piercer stopper and a side face of the piercer support are each greater than a difference between a central axis of the lid and a central axis of the needle body.

4. The reagent bottle lid opening mechanism according to claim 3, wherein
   the needle assembly further comprises:
      a piercer shaft supporting the needle body;
      a piercer guide covering the needle body; and
      a spring placed within the piercer guide to press the needle body toward the piercer shaft, wherein
         upon contact between the piercer stopper and the retaining plate, the spring contracts and the needle body contacts the lid.

5. The reagent bottle lid opening mechanism according to claim 4, wherein
   the piercer guide has a tapered portion, wherein
      the tapered portion of the piercer guide contacts a tapered portion of the lid to align the needle body with the center of the lid.

6. The reagent bottle lid opening mechanism according to claim 1, wherein the piercer supporter comprises:
   a plurality of balls in contact with the piercer stopper; and
   a support plate to hold the balls.

7. The reagent bottle lid opening mechanism according to claim 1, wherein
   the needle assembly travels from an original position to a piercing position during piercing of the lid; and
   the needle assembly automatically moves back to the original position after piercing the lid.

8. The reagent bottle lid opening mechanism according to claim 1, further comprising:
   a reagent loading tray to receive the reagent bottles at the automatic analyzer and to place the received reagent bottles; and
   a reagent transferor to transfer the reagent bottle placed in the reagent loading tray into the reagent disk, the reagent transferor comprising:
      a gripper to grip the reagent bottle.

9. The reagent bottle lid opening mechanism according to claim 4, wherein
   the reagent-bottle lid opener comprises a piercer shaft guide to guide the piercer shaft.

10. The reagent bottle lid opening mechanism according to claim 5, wherein
    the reagent-bottle comprises a plurality of lids, and
    the reagent-bottle lid opener comprises a plurality of needle bodies.

11. The reagent bottle lid opening mechanism according to claim 8, wherein
    the reagent loading tray comprises one or more reagent slots for installing a reagent-bottle, and
    in a case where an empty reagent-bottle is discharged from the reagent disk when a reagent-bottle to be loaded into the analyzer is installed in all the reagent slots, the reagent transferor is configured to:
       load the reagent-bottle placed on the reagent loading tray into the reagent disk without making an incision in the lid of the reagent-bottle and
       carry the empty reagent-bottle to the reagent slot.

12. The reagent bottle lid opening mechanism according to claim 11, wherein,
    in a case that there is a vacant reagent slot, the reagent transferor carries the reagent-bottle, which was loaded into the reagent disk without making the incision in the lid, into the vacant reagent slot.

* * * * *

UNITED STATES PATENT AND TRADEMARK OFFICE
CERTIFICATE OF CORRECTION

| | |
|---|---|
| PATENT NO. | : 11,327,088 B2 |
| APPLICATION NO. | : 16/076807 |
| DATED | : May 10, 2022 |
| INVENTOR(S) | : Masaki Hara, Takamichi Mori and Masato Ishizawa |

It is certified that error appears in the above-identified patent and that said Letters Patent is hereby corrected as shown below:

On the Title Page

Column 1, at (22) should read as follows:
(22) PCT Filed: January 31, 2017

Signed and Sealed this
Fourteenth Day of February, 2023

Katherine Kelly Vidal
*Director of the United States Patent and Trademark Office*